(12) United States Patent
Chalasani et al.

(10) Patent No.: US 6,190,796 B1
(45) Date of Patent: Feb. 20, 2001

(54) BATTERY HAVING RECESSED POSTS AND STAND SYSTEM

(75) Inventors: Subhas Chandra Chalasani, Plano; Keith Bruce Kelley, Forney; Roy Kuipers, Rockwell; Yehoshua Mandelcorn, Dallas, all of TX (US)

(73) Assignee: Lucent Technologies, Inc., Murray Hill, NJ (US)

(*) Notice: Under 35 U.S.C. 154(b), the term of this patent shall be extended for 0 days.

(21) Appl. No.: 09/267,967

(22) Filed: Mar. 12, 1999

(51) Int. Cl.[7] ....................................... H01M 2/00
(52) U.S. Cl. ..................... 429/100; 429/96; 429/121; 429/122
(58) Field of Search ..................... 429/100, 121, 429/122, 159, 163, 178, 97, 98, 96

(56) References Cited

U.S. PATENT DOCUMENTS

| | | | |
|---|---|---|---|
| 3,301,712 | * | 1/1967 | Bach ..................................... 429/121 |
| 3,864,173 | * | 2/1975 | Butschkau ............................ 136/181 |
| 4,221,450 | * | 9/1980 | Sears ...................................... 339/75 |
| 4,756,978 | * | 7/1988 | Nitcher et al. ............................ 429/1 |
| 5,200,280 | * | 4/1993 | Karasa .................................... 429/65 |
| 5,604,050 | * | 2/1997 | Brunette et al. ........................ 429/97 |
| 6,025,088 | * | 2/2000 | Kump .................................... 429/121 |

\* cited by examiner

*Primary Examiner*—Stephen Kalafut
*Assistant Examiner*—M. Wills
(74) *Attorney, Agent, or Firm*—Locke Liddell & Sapp LLP

(57) ABSTRACT

A battery having a top wall, a bottom wall, a pair of end walls and a pair of side walls includes a pair of recesses disposed within one of the battery walls. Battery post contacts are disposed within the recesses. The battery post contacts do not extend beyond the recesses. A stand includes a pair of stand post contacts which are adapted for mating with the battery post contacts within the battery recesses.

17 Claims, 4 Drawing Sheets

BATTERY HAVING RECESSED POSTS AND STAND SYSTEM

TECHNICAL FIELD OF THE INVENTION

The present invention relates to batteries, and more particularly to a battery and stand system wherein the battery plugs into a stand without requiring external connections such as, for example, cables or bus bars.

BACKGROUND OF THE INVENTION

Typical battery connections are made through cabling or bus bars that are secured to the posts of a battery. The connections are made using screw type connections requiring an installer to properly torque each of the connections to a predetermined value. These connections require a periodic check and validation of the torque to ensure a good connection.

Batteries having posts extending from the surface of the battery require specialized packing for shipping. Under certain circumstances, the battery posts can create safety hazards as the battery can be shorted when the posts are simultaneously contacted by an external cable and debris.

A need has thus arisen for a battery having an improved connection system for connecting a battery to a battery stand.

SUMMARY OF THE INVENTION

In accordance with the present invention, a battery having a top wall, a bottom wall, a pair of end walls and a pair of side walls is provided. A pair of recesses are disposed within one of the battery walls. Battery post contacts are disposed within the recesses and are adapted for mating with post contacts located on a battery stand. The battery post contacts do not extend beyond the recesses.

In accordance with another aspect of the present invention, a battery and stand system is provided. The battery includes a top wall, a bottom wall, a pair of end walls, and a pair of side walls. A pair of recesses are disposed within one of the battery walls. Battery post contacts are disposed within the recesses. The stand includes a pair of stand post contacts which are adapted for mating with the battery post contacts within the battery recesses.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
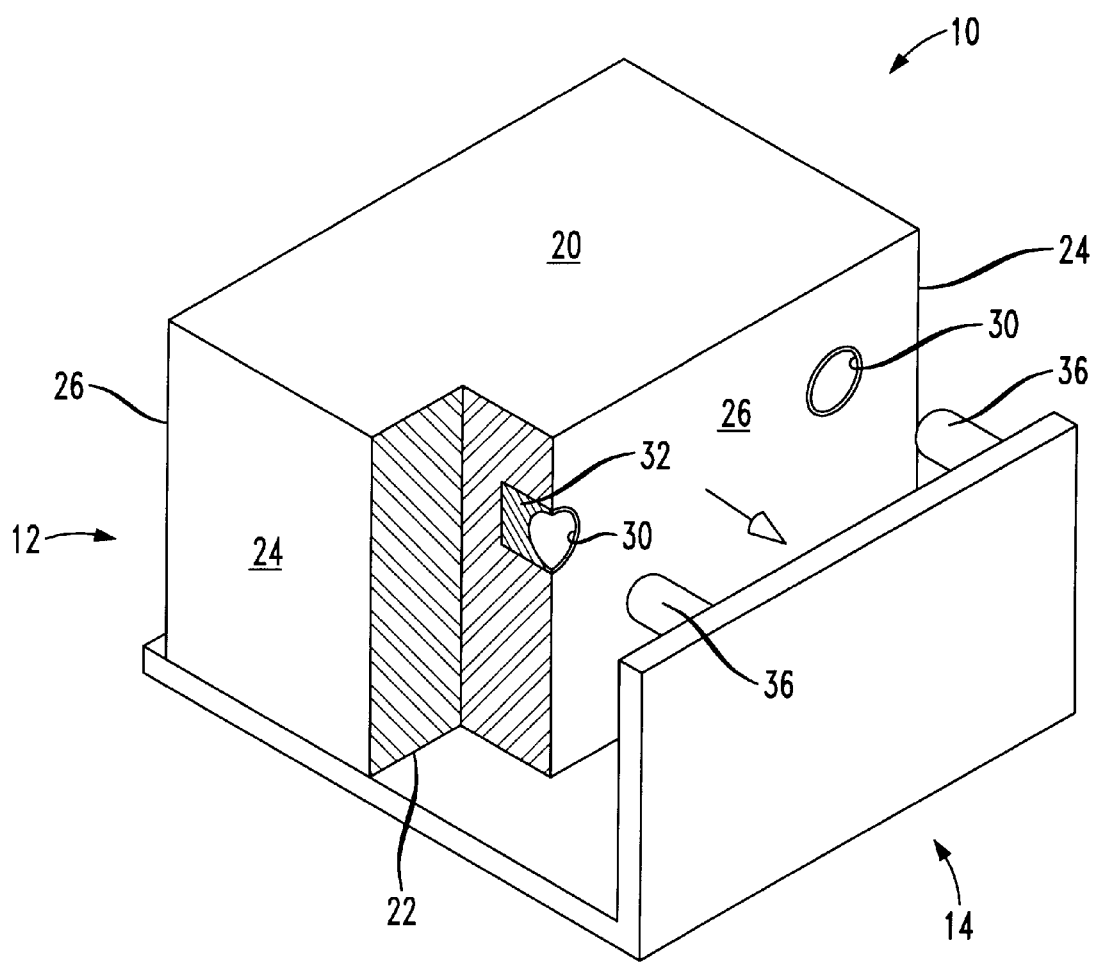
FIG. 1 is a perspective view of a battery and stand system in accordance with the present invention.

Referring to FIG. 1, the present battery and stand system is illustrated, and is generally identified by the numeral 10. System 10 includes a battery, generally identified by the numeral 12 and a stand generally identified by the numeral 14. Battery stand 14 may include, for example, a rack, shelf, or cabinet which supports and houses battery 12. Battery 12 includes a top wall 20, bottom wall 22, end walls 24, and side walls 26.

An important aspect of the present invention is the use of recesses 30 disposed within a wall of battery 12. FIG. 1 illustrates recesses 30 disposed within a side wall 26 of battery 12, it being understood that recesses 30 may be positioned in either side wall 26 or either of end walls 24, depending upon the design parameters of system 10. Disposed within each recess 30 is a battery post contact 32. Battery post contacts 32 engage a link which is connected to the battery plates internal of battery 12. Battery 12 links and plates have not been illustrated in FIG. 1 for clarity of illustration. Battery post contacts 32 represent the positive and negative terminals of battery 12. Battery post contacts 32 may comprise, for example, brass material.

Stand 14 includes a pair of stand post contacts 36 which are disposed on stand 14 for alignment with recesses 30 of battery 12. Battery 12 is connected to battery stand 14 by plugging stand post contacts 36 into recesses 30 to engage battery post contacts 32. Battery post contacts 32 have a concave profile for mating with stand post contacts 36 which have a convex profile to ensure positive alignment with the greatest amount of contact area in the connection. Stand post contacts 36 being interconnected to battery stand 14 provide a positive pressure to the connection contact area ensuring constant contact between battery 12 and battery stand 14.

Battery 12 is therefore pluggable into stand 14 without the necessity to make any additional physical connections to battery 12, such as through battery cables or bus bars. Battery post contacts 32 being recessed allows for simplification in packaging and shipping of battery 12. Additionally, the safety of battery 12 is improved since battery post contacts 32 are recessed to avoid shorting of these contacts by external items being placed adjacent to the surface of the walls of battery 12.

Figure 2:
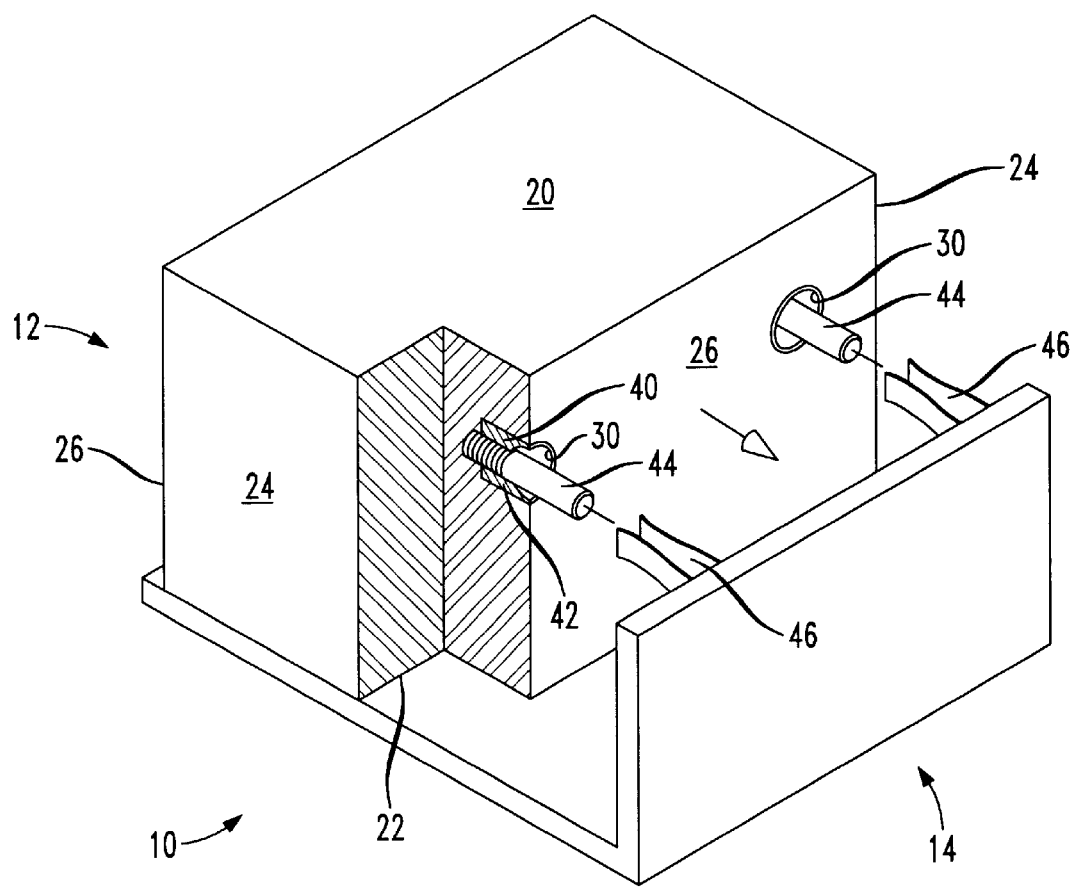
FIG. 2 is a perspective view of an additional embodiment of the present battery and stand system.

Referring now to FIG. 2, an additional embodiment of the present system 10 is illustrated. Battery 12 includes battery post contacts 40 which include a threaded aperture 42 for receiving a threaded shaft 44. Threaded shaft 44 extends beyond recesses 30 and side wall 26 to engage stand post contacts 46.

Figure 3:
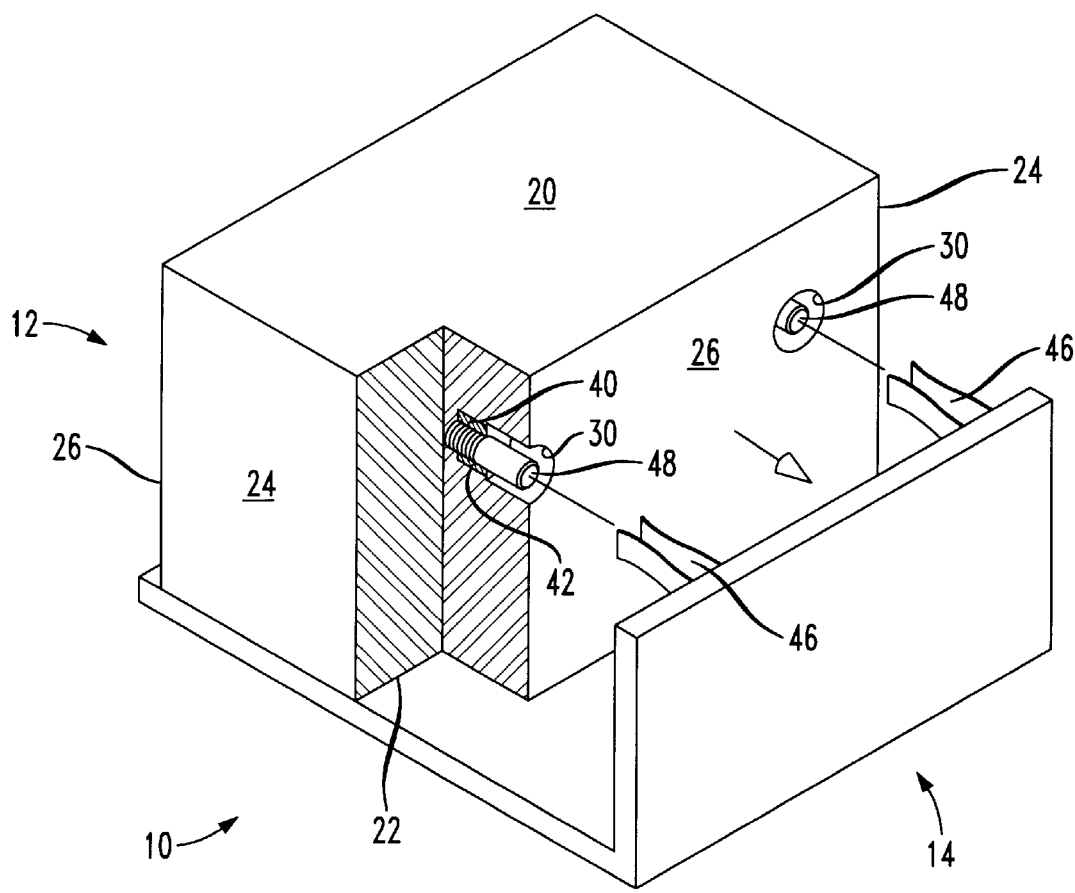
FIG. 3 is a perspective view of an additional embodiment of the present battery and stand system.

Referring now to FIG. 3, a further embodiment of system 10 is illustrated. System 10 includes battery post contacts 40 having threaded aperture 42. A threaded shaft 48 is received by threaded aperture 42 of battery post contact 40. Threaded shaft 48 is shorter in length than threaded shalt 44 (FIG. 2) such that the connection between threaded shaft 48 and stand post contacts 46 occurs internally within recesses 30.

Figure 4:
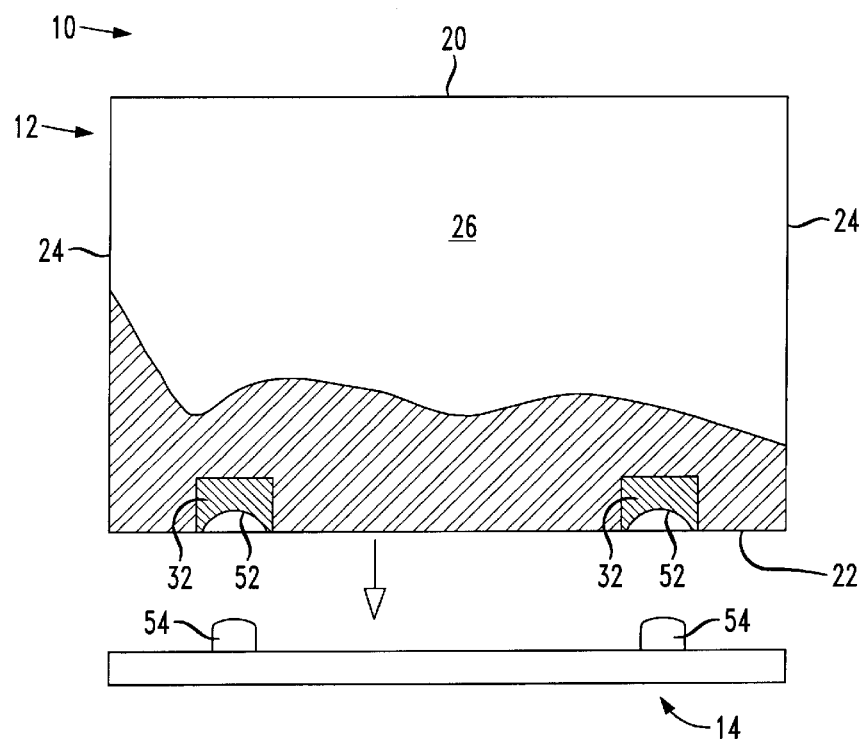
FIG. 4 is a side elevational view of a further embodiment of the present battery and stand system.

Referring now to FIG. 4, a further embodiment of system 10 is illustrated. Battery 12 is mounted to battery stand 14 through bottom wall 22 of battery 12. Bottom wall 22 of battery 12 includes recesses 52 which receive battery post contacts 32. Battery stand 14 includes stand post contacts 54 which engage battery post contacts 32. Alternatively, recesses 52 may be disposed in top wall 20, and battery 12 is turned upside down prior to connecting to stand 14. In the embodiment illustrated in FIG. 4, gravity maintains the connection between battery 12 and battery stand 14.

Figure 5:
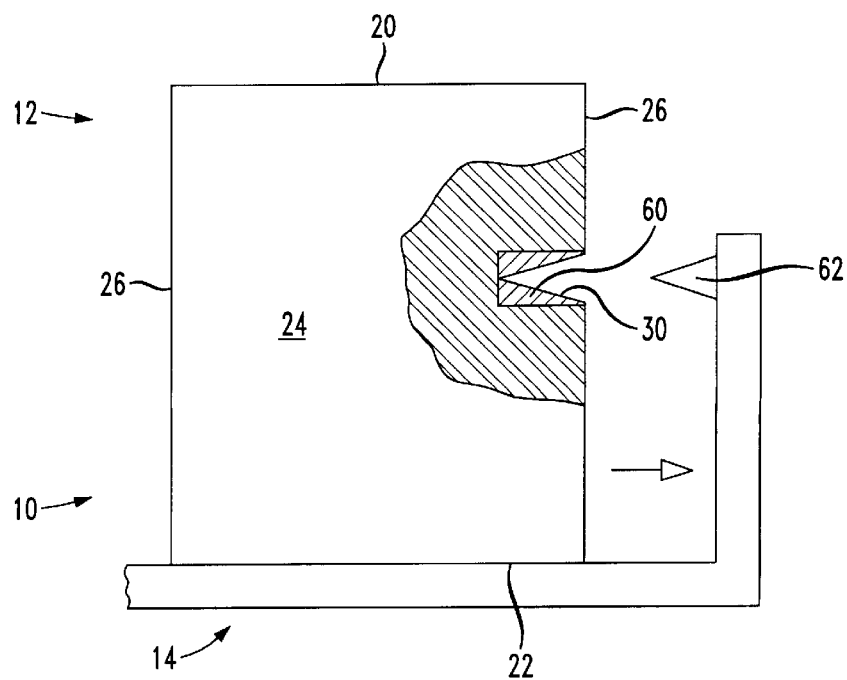
FIG. 5 is a side elevational view of a further embodiment of the present battery and stand system.

Referring now to FIG. 5, a further embodiment of system 10 is illustrated. Battery 12 includes a battery post contact 60 mounted within recesses 30. Battery post contact 60 is triangular in shape for mating with a triangular shaped stand post contact 62. Battery 12 and battery stand 14 function in a manner similar to the system 10 illustrated in FIG. 1.

It therefore can be seen that the present battery and stand system provides for a battery that plugs into a battery stand without requiring external physical connections to the battery such as, for example, through cables or bus bars. The battery post contacts are recessed to simplify packaging, shipping, and safety of the battery.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A battery for use with a battery stand, the stand including battery stand post contacts, the battery comprising:
   a top wall, a bottom wall, a pair of end walls, and a pair of side walls, said end walls and said side walls being disposed between said top wall and said bottom wall;
   a pair of recesses disposed within said battery walls; and
   battery post contacts disposed within said recesses and adapted for mating with the battery stand post contacts within said recesses, such that said battery post contacts do not extend beyond said recesses.

2. The battery of claim 1 wherein said battery post contacts have a generally concave surface.

3. The battery of claim 1 wherein said recesses are disposed within one of said battery side walls.

4. The battery of claim 1 wherein said recesses are disposed within said battery bottom wall.

5. The battery of claim 1 wherein said recesses are disposed within said battery top wall.

6. The battery of claim 1 wherein said battery post contacts include a threaded aperture for receiving a contact shaft for mating with the battery stand post contact.

7. The battery of claim 6 wherein said contact shaft is completely disposed within said recess.

8. The battery of claim 6 wherein said contact shaft extends outside said recess.

9. A battery and stand system comprising:
   a battery having a top wall, a bottom wall, a pair of end walls, and a pair of side walls, said battery end walls and said battery side walls being disposed between said battery top wall and said battery bottom wall;
   a pair of recesses disposed within said battery walls;
   battery post contacts disposed within said recesses, such that said battery post contacts do not extend beyond said recesses; and
   a stand including a pair of stand post contacts for mating with said battery post contacts within said recesses.

10. The system of claim 9 wherein said battery post contacts have a generally concave surface and said battery stand post contacts have a generally convex surface.

11. The system of claim 9 wherein said battery post contacts have a generally triangular surface and said battery stand post contacts have a generally triangular surface.

12. The system of claim 9 wherein said recesses are disposed within one of said battery side walls.

13. The system of claim 9 wherein said recesses are disposed within said battery bottom wall.

14. The system of claim 9 wherein said recesses are disposed within said battery top wall.

15. The system of claim 9 wherein said battery post contacts included a threaded aperture for receiving a contact shaft for mating with said battery stand post contacts.

16. The system of claim 15 wherein said contact shaft is completely disposed within said recesses.

17. The system of claim 15 wherein said contact shaft extends outside said recesses.

* * * * *